United States Patent [19]
Gause et al.

[11] Patent Number: 5,253,132
[45] Date of Patent: Oct. 12, 1993

[54] CASSETTE TAPE CAPSTAN DRIVE WITH ROCKER ABOVE CAPSTAN FOR SWINGING PRESSURE ROLLER OUT OF AND INTO READY POSITION AND WITH MAGNET-FORCE FOR PRESSURE

[75] Inventors: Dieter Gause, Weiterstadt; Rainer Kaus, Hochheim; Werner Maack, Seeheim-Jugenheim; Reinhard Weber, Reinheim, all of Fed. Rep. of Germany

[73] Assignee: BTS Broadcast Television Systems GmbH, Darmstadt, Fed. Rep. of Germany

[21] Appl. No.: 786,505

[22] Filed: Nov. 1, 1991

[30] Foreign Application Priority Data

Nov. 10, 1990 [DE] Fed. Rep. of Germany ....... 4035863

[51] Int. Cl.$^5$ .................... G11B 15/29; G11B 15/61
[52] U.S. Cl. ........................ 360/85; 360/95; 360/130.21; 360/130.31
[58] Field of Search .............. 360/85, 95, 130.21, 360/130.22, 130.23, 130.2, 130.31, 130.32, 130.3

[56] References Cited

U.S. PATENT DOCUMENTS

| | | | |
|---|---|---|---|
| 3,797,036 | 3/1974 | Eibensteiner | 360/85 |
| 3,831,198 | 8/1974 | Kihara et al. | 360/85 |
| 3,860,960 | 1/1975 | Akamine | 360/85 |
| 4,259,700 | 3/1981 | Gause et al. | 360/95 |
| 4,410,919 | 10/1983 | Umeda | 360/85 |
| 4,413,293 | 11/1983 | Hathaway | 360/85 |
| 4,437,129 | 3/1984 | Yoshida et al. | 360/85 |

Primary Examiner—John H. Wolff
Assistant Examiner—Craig A. Renner
Attorney, Agent, or Firm—Frishauf, Holtz, Goodman & Woodward

[57] ABSTRACT

A tape drive mechanism for magnetic tape apparatus for tapes housed in cassettes has a pressure roller (29) at one end of a press-on lever (35) which is pivotally held on a drive shaft bearing (31) of a drive shaft (30) so that it can be inclined in a vertical plane. Another end of the press-on lever (35) has the guide cavity (37) in which a grade element (38) is held. The guide element is affixed at the end of a bascule lever (40) which is pivoted also on the supporting bearing (31) of the drive shaft (30). The bascule lever (40) is controlled by the progress of a tape threading operation of a tape loading device, the control being in the axial direction of the drive shaft (30).

15 Claims, 4 Drawing Sheets

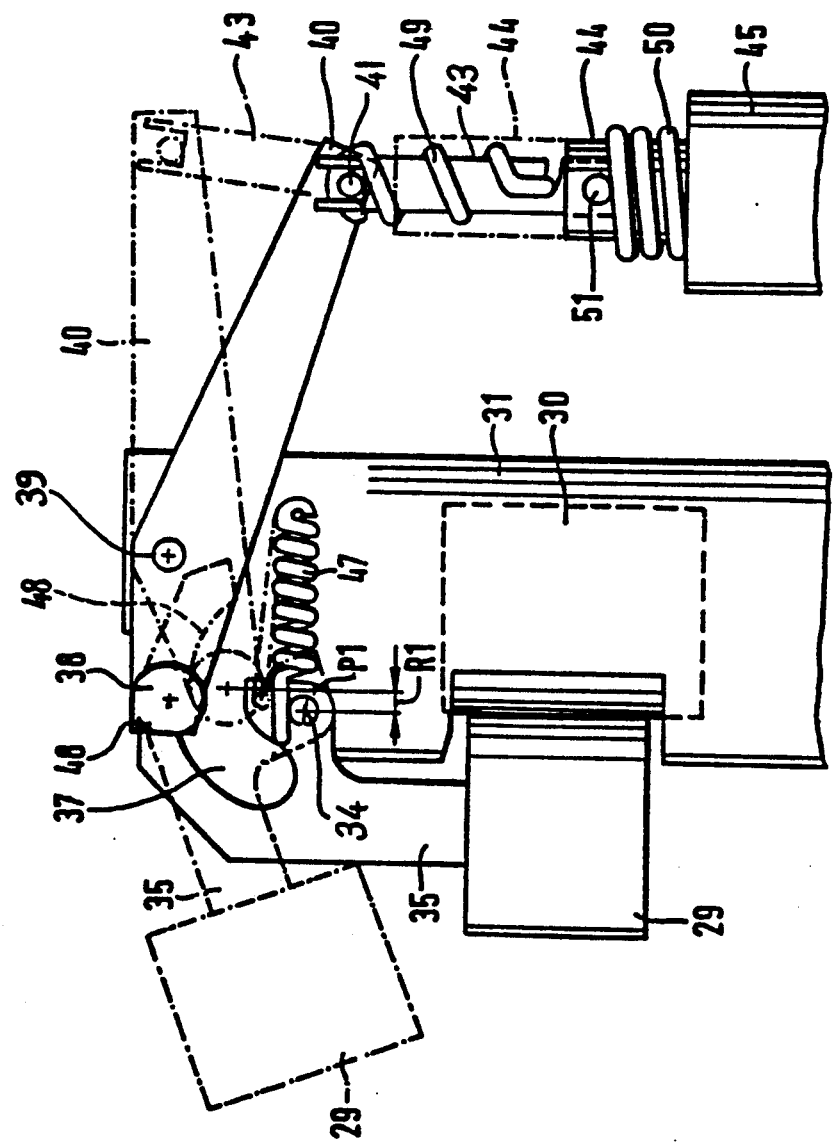

CASSETTE TAPE CAPSTAN DRIVE WITH ROCKER ABOVE CAPSTAN FOR SWINGING PRESSURE ROLLER OUT OF AND INTO READY POSITION AND WITH MAGNET-FORCE FOR PRESSURE

This invention concerns a tape transport mechanism for a magnetic tape apparatus for reading from and/or writing onto a tape supplied in a cassette. Such apparatus contains a tape loading device for pulling out a tape stored in a cassette and disposing it around a drum shaped tape-scanning device, a drive shaft or capstan for moving the pulled out tape lengthwise of the tape, a shaft bearing for supporting the drive shaft and a press-on roller capable of being swung between a quiescent position in which it is spaced away from the drive shaft and a driving position in which it presses the tape against the drive shaft.

A tape drive mechanism for magnetic tape stored in cassettes is known from German patent 31 08 684 C2 in which a tape drive shaft projects into the magnetic tape cassette through a hole provided for the purpose, in order to grasp the magnetic tape located in the cassette from behind. In playback operation of the magnetic tape apparatus a press-on roller mounted on a swinging arm passes through the cassette mouth and presses a tape against the drive shaft. In such apparatus the press-on roller is first moved out of a position far from the drive shaft into a position adjacent to the drive shaft. When the latter position is reached, a solenoid magnet presses the press-on roller against the drive shaft.

The above described tape drive mechanism has the disadvantage, however, that the drive shaft for transport of the magnetic tape is disposed relatively far from the rotary scanning device for playing back the tape. Longitudinal stretching of the magnetic tape therefore gives rise to tracking errors. A further disadvantage is that the pulling tension of the magnetic tape cannot be measured directly in the neighborhood of the wound up tape located in the magnetic tape cassette, because the necessary space for a tape tension feeler lever is used up by the tape drive mechanism. The resulting offset of the tape sensing lever produces additional tracking errors.

SUMMARY OF THE INVENTION

It is an object of the present invention to provide a magnetic tape drive mechanism which, on the one hand, makes possible the pulling out and threading of the magnetic tape and, on the other hand, can be disposed in the immediate neighborhood of the rotary scanning device for the tape.

Briefly, the axle or hub of the press-on roller is disposed at one end of a lever which is pivotally mounted on the shaft bearing provided for supporting the drive shaft, so that this lever can be variably inclined by a device for swinging the lever in such a way that when the magnetic tape is not pulled out of a cassette the pressure roller is swung out of a tape-threading path at approximately 90° from the vertical axis direction of the drive shaft and after the magnetic tape is threaded around the scanning device the roller on the end of the lever is swung into a position in which its axis is parallel to the axis of the drive shaft.

The tape drive mechanism of the invention has the advantage that the press-on forces of the press-on roller heretofore abutting on a tape transport plate now can be taken up in a compact capstan unit disposed adjacent to the rotary scanning device. Moreover, the space required by the tape drive mechanism on the tape transport plate is not reduced by the mechanism that swings the press-on roller. It is useful for the lever at its end remote from the press-on roller to be coupled with an element that slides in a guide cavity and is linked to a bascule lever the position of which is controllable by the loading condition (threading condition) of the tape loading device. This bascule lever can be held in a bearing on the supporting structure which includes the bearing of the drive shaft.

It is also useful for the guide cavity and the press-on lever to be so constituted that the press-on roller, after completion of a threading process, first pauses in a waiting position almost parallel to the drive shaft and in front of it and then, when the magnetic tape apparatus is put into a recording or playback operation, the press-on roller is brought into operating position by the armature of an auxiliary magnet held by the bascule lever and thereby pressed against the drive shaft. The solenoid magnet can also be attached to the supporting shaft bearing of the drive shaft.

It is also convenient to provide a rocking yoke having at least one lateral guide groove into which another guide element disposed in a slide-like threading device of the tape loading device grips the yoke for shifting the inclination angle of the yoke during the threading operation.

A tension spring is useful for pulling the press-on lever against a torque supplied by the first mentioned guide element and thereby pulling the press-on lever into its initial position ready for use.

DRAWINGS

The invention is further described by way of illustrative example with reference to the annexed drawings, in which:

FIG. 4 is a basic diagram for explaining the lever relations of the tape drive mechanism of the invention.

DESCRIPTION OF THE ILLUSTRATED EMBODIMENTS

Figure 1:
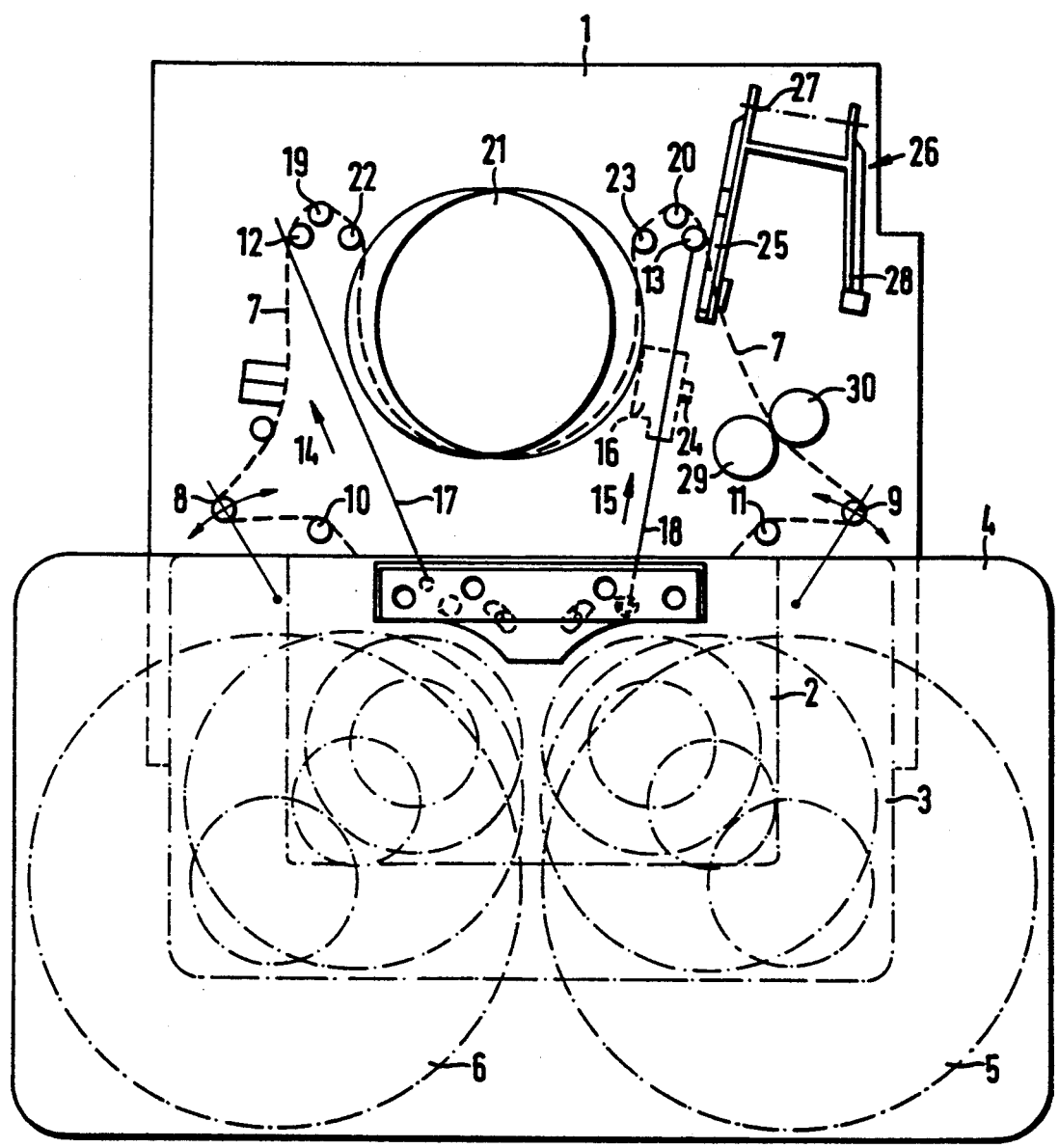
FIG. 1 is a top view of a tape loading device in the magnetic tape apparatus utilizing tapes in cassettes, in this case for three different cassette sizes.

In FIG. 1 the reference numeral 1 designates a tape transport plate of a magnetic tape apparatus for cassettes. In the illustrated example the magnetic tape apparatus is equipped for using three different sizes of magnetic tape cassettes 2, 3 and 4. After the insertion of a magnetic tape cassette, for example a large magnetic tape cassette 4, into a cassette shaft not shown in the drawing, a tape which extends between a supply reel 5 and a take-up reel 6 is pulled out of the magnetic tape cassette 4. For that purpose rollers 8 and 9 of the respective tape pulling levers are gripped from behind the magnetic tape 7 which is located in the cassette mouth and dispose it out around the rollers 10 and 11. Then pins 12 and 13 which are movable in position bring it out in the direction of the arrows 14 and 15. The movable pins 12 and 13 are pivoted on slide 16 which slides on rails 17 and 18. With the assistance of shiftable rollers 19 and 20 as well as movable pins 22 and 23 that stand obliquely the magnetic tape 7 is looped helically about a rotary scanning device 21, the movable and obliquely standing pins 22 and 23 fixing the height of the tape 7 over guide disks.

The slide 16 has a lateral guide element 24 which can be constituted as a ball bearing. The guide element 24 grasps a yoke 26 with a movement in the direction of the arrow 15 in a lateral guiding groove, so as to alter the angle of inclination of the yoke 26, pivoted at 27 on the transport plate 1, by means not further shown. An arm 28 coupled mechanically with the yoke 26 controls the position of a press-on roller 29 in such a way that the magnetic tape 7 is pressed against a drive shaft 30 for producing transport of the magnetic tape 7 which is now in its operating position.

Figure 2:
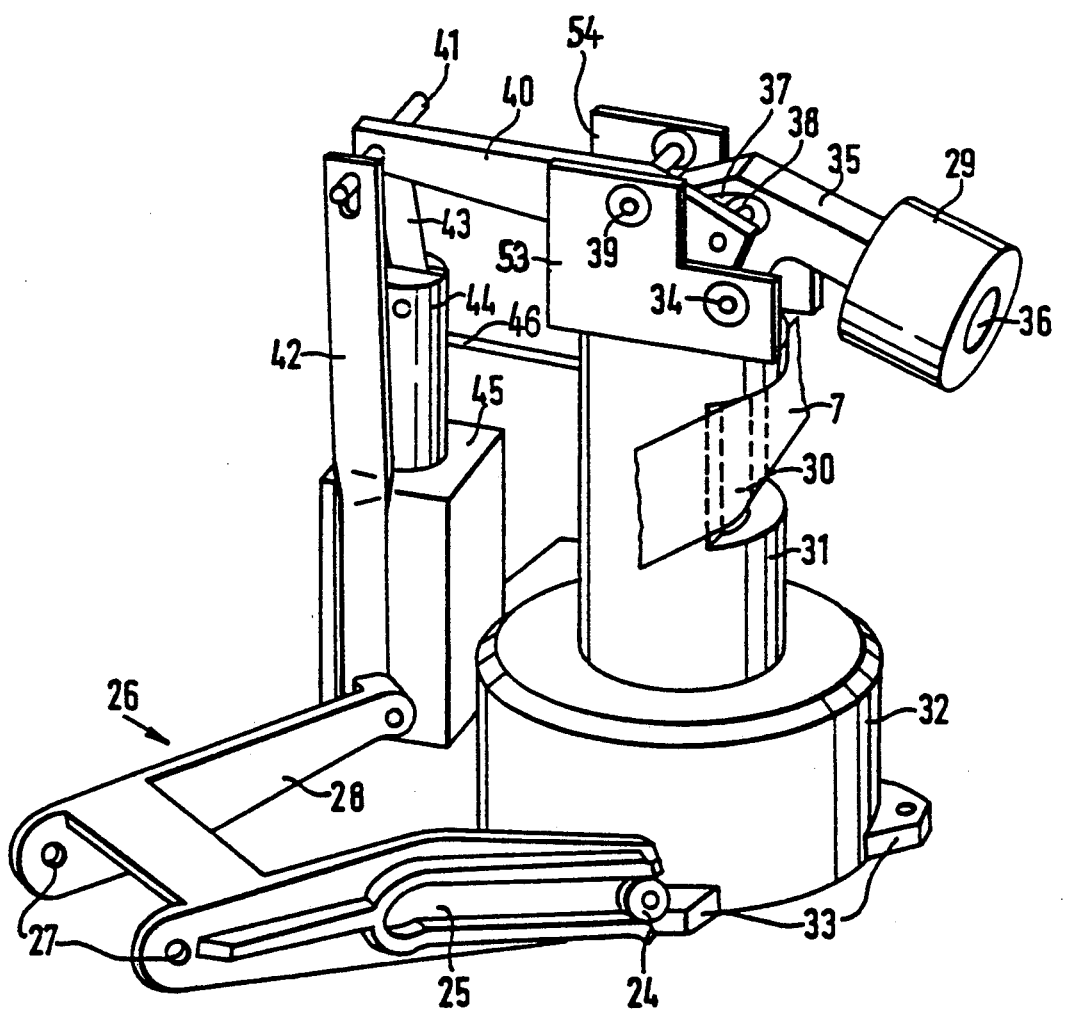
FIG. 2 is a perspective representation of a tape drive mechanism according to the invention with a press-on roller that is upwardly basculated.

FIG. 2 is a perspective representation of the tape drive mechanism of the invention for longitudinal transport of the magnetic tape 7. In FIG. 2 and subsequent figures the same parts are designated with the same reference numerals.

The drive shaft 30 is concentrically surrounded by a shaft bearing 31. In the middle portion of the shaft bearing 31 an opening is provided for laying the magnetic tape 7 on the surface of the drive shaft 30. The lower part of the shaft bearing 31 rests on a motor housing 32 in which the motor for driving the drive shaft 30 is placed. The motor housing 32 is connected through a flange 33 with the transport equipment plate 1.

Above the shaft bearing 31, a press-on lever 35 is pivoted on a rod 34 mounted on plates 53 and 54 supported by the shaft bearing 31 near its upper extremity. At one end of the press-on lever 35 a press-on roller axle 36 is provided for the press-on roller 29. The other end of the press-on lever 35 has a slideway 37 in which a guide element 38 intrudes and is held. The function of this sliding guide will now be explained more completely with reference to FIG. 2.

The guiding element 38, which advantageously is constituted as a ball bearing, is located and held at one end of the bascule lever 40. The lever 40 is pivoted so that it can rotate about a horizontal axis 39. At the other end of the bascule lever 40 there is a cross rod 47, which on one side of the lever 40 is coupled with the arm 28 of the yoke 26 by means of a drawbar 42, while at the other side of lever 40 the cross rod 41 is coupled with an armature 44 of a solenoid magnet 45 by means of another drawbar 43. The magnet 45 is affixed to the shaft bearing 31 which supports the drive shaft 30 by means of a mounting bracket 46.

In FIG. 2 the yoke 26 is pressed upwardly by the guide element 24 because of its illustrated inclination to the guide groove 25. In connection with the drawbar 42, the bascule lever 40 and the engagement of the guide element 38 in the guideway 37, the press-on lever 35 and thereby the press-on roller 29 is held away from the magnetic tape 7, i.e., it is swung upwards and there held by spring force with its axis in a nearly horizontal position.

Figure 3:
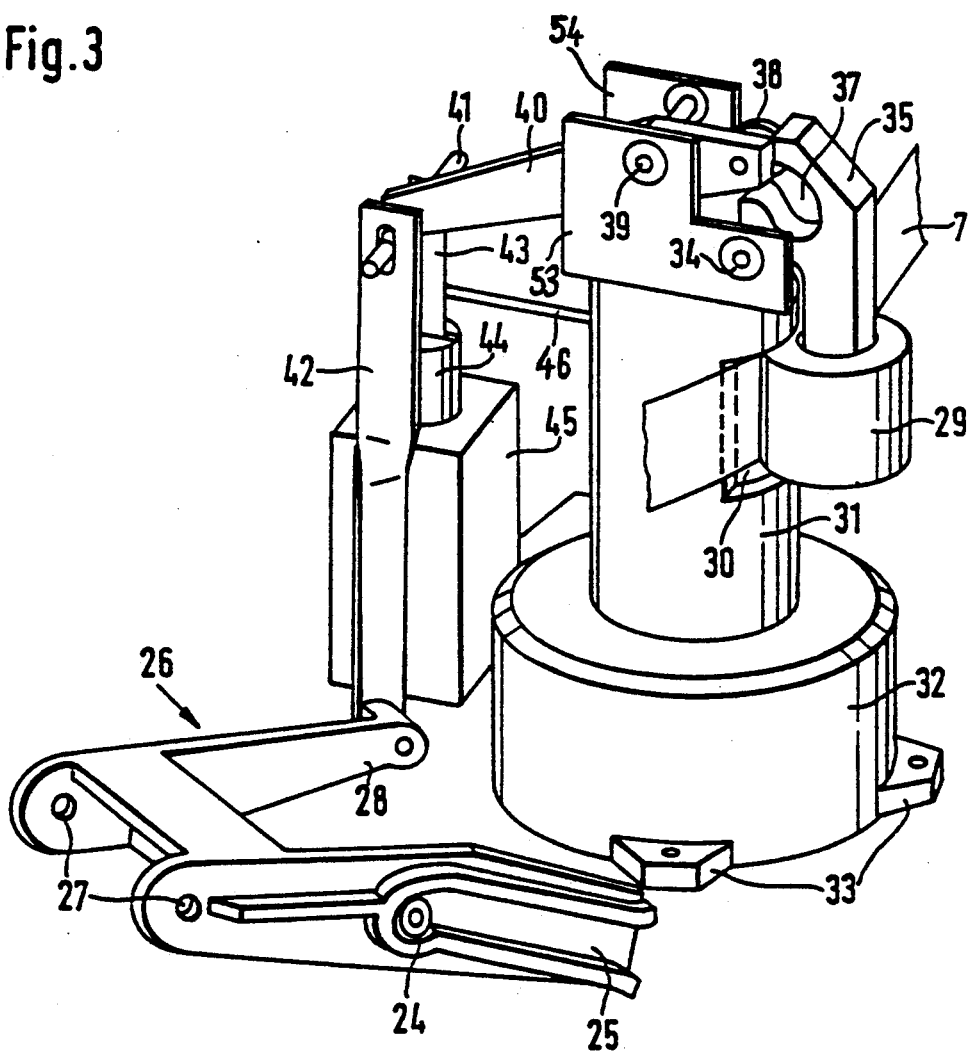
FIG. 3 is a perspective representation of a tape drive mechanism according to the invention with a downwardly basculated press-on roller in the playback operation of the magnetic tape apparatus.

FIG. 3 shows the tape drive mechanism of FIG. 2 in a state in which the guide element 24 has traveled all the way along the lateral guide groove 25 by movement of the slide 16 in the direction of the arrow 15. The arm 28 of the yoke is depressed. Accordingly, by the resulting position of the drawbar 42 the bascule lever 40 and as a result of the slideway 37 guiding the press-on lever 35, that lever 35 is caused to flop down, which brings down the press-on roller 29, mounted on the press-on lever 35, into a waiting position. In recording or playback operation of the magnetic tape the bascule lever 40 is drawn downwards by the additional drawbar 43 and the armature 44 by the solenoid magnet 45, with increased momentum and the press-on roller 29 is thereby brought into its actual operating position and pressed against the drive shaft 30, so that the magnetic tape can be transported in its lengthwise direction.

The basic drawing of FIG. 4 which is provided for explanation of the relation of the levers to each other which are shown in the tape drive mechanism of FIGS. 2 and 3 is provided only for understanding of the necessary parts. The course of movement of the press-on roller 29 consists of three phases: in a first phase the lateral guide element 24 of the slide 16 moves over the length of the cam-like guide groove 25 towards the yoke 26 as well as the drawbar 42 and bascule lever 40. Since the drawbar 42 (FIG. 3) and the armature 44 (through the additional drawbar 43) engage the bascule lever 40 at its same end, the armature 44 is at the same time brought into the position shown in solid lines in FIG. 4. The bascule lever 40 presses the guide element 38 initially with a force F1 against the curve of the guide cavity 37. The initial position for the first phase corresponds to the chain-dotted position of the levers 35 and 40 and the guide element 38. In that initial position the guide element 38 is centered at P1 and fits in an end of the guide cavity 37. As the result of a horizontal offset R1 between the vertical radii respectively from the center P1 of the guide and from the center of the pivot 46 of the press-on lever 35, there arises a torque F1*R1 on the press-on lever 35 as the drawbar 42 begins to pull down the cross rod 41 and the lever 40 raises the guide element 38. In accordance with the guideway shape which is provided, the transfer of torque from the bascule lever 40 to the press-on lever 35 accelerates and at the same time a restoring spring 47 is put in tension. In a further movement of the press-on roller 29 which corresponds to a second phase of its movement, a gradual transition from the first phase to a third phase is produced which is controlled by the radius of the ball bearing serving as the guide element 38. In the third phase the armature 44 of the solenoid magnet 45, acting through the additional drawbar 43, draws the bascule lever 40 into the press-on position in which the press-on roller is pressed against the drive shaft 30.

A surface 48 in the guideway region of the press-on lever 35 is so shaped that a small torque on the bascule lever 40 produces a large press-on force. The illustrated mechanism in this case produces a transition to slower movement. The chain-dotted-line representation of the press-on roller 29 and of the press-on lever 35, the bascule lever 40, the additional drawbar 43 and the armature 44 show the initial position during the first phase. The solid lines show the positions of the press-on roller 29, the press-on lever 35, the bascule lever 40, the additional drawbar 43 and the armature 44 in the position of awaiting being put into final operation, as shown by the spring 49 being in its unextended position in FIG. 4. The center of the guide element 38, in moving from the chain dotted position to the solid line position of the guide element, moves in a circular arc centered on the axis of the pivot rod 39 of the bascule lever 40. Between the cross-rod 41 and the armature 44 a spring 49 is provided on the additional drawbar 43. The spring 49 finally, in the operation position, determines the press-on force transmitted by the bascule lever 40 of the press-on roller against the drive shaft 30. A spring 50 serves for compensation of the armature weight and holds the armature in a waiting position when the lever 35 is in its waiting position. It is located between the housing of the solenoid magnet 45 and a cross-rod 51 which connects the additional drawbar 43 and the armature 44 together.

Although the invention has been described with reference to a particular illustrative example, it will be recognized that modifications and variations are possible within the inventive concept.

We claim:

1. A tape transport mechanism for a magnetic tape apparatus for reading from and/or writing onto a tape supplied in a cassette and having
   a tape loading device for pulling out the tape stored in the cassette and disposing it around a drum-shaped tape-scanning device,
   a drive shaft having an axis in a vertical direction for moving the pulled out tape lengthwise of the tape,
   a shaft bearing which supports said drive shaft;
   a press-on roller swingable between a quiescent position in which it is spaced away from said drive shaft and a driving position in which it presses against said drive shaft,
   characterized in that
   a press-on roller axle (36) for said press-on roller (29) is disposed at one end of a press-on lever (35); and
   in that the press-on lever (35) is pivotally mounted on the shaft bearing (31) which supports the drive shaft (30) so that the press-on lever is variably inclined by means for swinging said lever (35) in such a way that prior to the tape (7) being pulled out of the cassette, the press-on roller (29) is swung out of a tape-threading path so that its axis is at approximately 90° to said axis direction of said drive shaft (30) and after the tape (7) is completely threaded in said mechanism, said press-on roller (29) is swung into a tape-driving position in which its axis is parallel to said axis of said drive shaft (30).

2. The tape transport mechanism of claim 1, wherein said press-on lever (35) has a first guide cavity (37) in which a first guide element (38) engages;
   wherein said first guide element (38) is held at one end of a bascule lever (40) which is mounted to permit rotation about a horizontal axle (39), and
   wherein means are provided for altering a position of said bascule lever (40) in a manner dependent upon a stage of loading contemporarily reached by said tape loading device.

3. The tape transport mechanism of claim 2, wherein said guide cavity (37) of said press-on lever (35) has such a shape that the press-on roller (29), after completion of threading by said tape loading device, is first halted in a waiting position in which its axis is nearly parallel to that of said drive shaft (30) and means are provided, responsive to putting said apparatus into recording or playback operation, for bringing said press-on roller (29) into operating position by means of an armature (44) of a solenoid magnet (45), whereby said press-on roller (29) is pressed against said drive shaft (30).

4. The tape transport mechanism of claim 3, wherein a tension spring (47) is provided for drawing said press-on lever (35) and said press-on roller (29) away from said shaft (30) into a raised position, against torque produced by pressure from said first guide element (38) about a pivot (34) of said press-on lever (35).

5. The tape transport mechanism of claim 2, wherein said bascule lever (40) is pivoted on top of said shaft bearing (31) which supports said drive shaft (30).

6. The tape transport mechanism of claim 5, wherein said guide cavity (37) of said press-on lever (35) has such a shape that the press-on roller (29), after completion of threading by said tape loading device, is first halted in a waiting position in which its axis is nearly parallel to that of said drive shaft (30) and means are provided, responsive to putting said apparatus into recording or playback operation, for bringing said press-on roller (29) into operating position by means of an armature (44) of a solenoid magnet (45), whereby said press-on roller (29) is pressed against said drive shaft (30).

7. The tape transport mechanism of claim 5, wherein said bascule (40), at an end remote from said first guide element (38), is linked to a yoke (26) which is pivoted for being inclined in response to procedures respectively of threading and unthreading of the tape in said tape loading device.

8. The tape transport mechanism of claim 7, wherein said guide cavity (37) of said press-on lever (35) has such a shape that the press-on roller (29), after completion of threading by said tape loading device, is first halted in a waiting position in which its axis is nearly parallel to that of said drive shaft (30) and means are provided, responsive to putting said apparatus into recording or playback operation, for bringing said press-on roller (29) into operating position by means of an armature (44) of a solenoid magnet (45), whereby said press-on roller (29) is pressed against said drive shaft (30).

9. The tape transport mechanism of claim 7, wherein said yoke (26) has at least one lateral guiding groove (25) in which a second guide element (24) engages, which second guide element is attached to a slide-like threading device (16) of said tape loading device in such a way that an angle of inclination of said yoke (26) is shifted during the progress of threading the tape by means of said tape loading device.

10. The tape transport mechanism of claim 7, wherein said guide cavity (37) of said press-on lever (35) has such a shape that the press-on roller (29), after completion of threading by said tape loading device, is first halted in a waiting position in which its axis is nearly parallel to that of said drive shaft (30) and means are provided, responsive to putting said apparatus into recording or playback operation, for bringing said press-on roller (29) into operating position by means of an armature (44) of a solenoid magnet (45), whereby said press-on roller (29) is pressed against said drive shaft (30) and wherein said end of said bascule lever (40) which is remote from said first guide element (38) is linked to said yoke (26) by a first drawbar (42) and is linked to said armature (44) by a second drawbar (43) for bringing said armature into and out of a waiting position.

11. The tape transport mechanism of claim 10, wherein said solenoid magnet (45) is affixed to said shaft bearing (31) which supports said drive shaft (30).

12. The tape transport mechanism of claim 10, wherein a tension spring (47) is provided for drawing said press-on lever (35) and aid press-on roller (29) away from said shaft (30) into a raised position, against torque about a pivot (34) produced by said first guide element (38).

13. The tape transport mechanism of claim 10, wherein said yoke (26) has at least one lateral guiding groove (25) in which a second guide element (24) engages, which second guide element is attached to a slide-like threading device (16) of said tape loading device in such a way that an angle of inclination of said yoke (26) is shifted during the progress of threading the tape by means of said tape loading device.

14. The tape transport mechanism of claim 10, wherein a helical spring (49) is mounted on and around said second drawbar (43) for providing an extensible link of said second drawbar (43), at the upper end thereof, with a cross rod (41) of said bascule lever (40) and thereby determining the force transmitted from said armature (44) by way of said bascule lever (40) to said press-on lever (35) as said solenoid magnet, drawing said armature (44) and said bascule lever (40), bears against said press-on lever (35) in a press-on position.

15. The tape transport mechanism of claim 10, wherein a helical spring (50) is mounted around said armature (44) between said solenoid magnet (45) and a pivot rod (51) connecting the upper end of said armature with said second drawbar (43) for opposing the weight of said armature and urging it to a waiting position prior to said solenoid magnet (45) being energized.

* * * * *